United States Patent [19]

Diamantoglou et al.

[11] Patent Number: 4,708,985

[45] Date of Patent: Nov. 24, 1987

[54] HYDROPHILIC POLYESTER COMPOUNDS

[75] Inventors: Michael Diamantoglou, Erlenbach; Helmut Mägerlein, Obernburg; Walter Brodowski, Amorbach; Wolfgang Grimm, Elsenfeld; Gerhard Meyer, Obernburg, all of Fed. Rep. of Germany

[73] Assignee: Akzona Incorporated, New York, N.Y.

[21] Appl. No.: 360,146

[22] Filed: Mar. 22, 1982

[30] Foreign Application Priority Data

Jul. 12, 1981 [DE] Fed. Rep. of Germany ....... 3110906

[51] Int. Cl.$^4$ .............................................. C08L 67/02
[52] U.S. Cl. .................................... 525/166; 525/173; 525/174; 525/175; 525/176
[58] Field of Search ............... 525/176, 175, 166, 173, 525/174

[56] References Cited

U.S. PATENT DOCUMENTS

| | | | |
|---|---|---|---|
| 3,435,093 | 3/1969 | Cope | 525/166 |
| 3,639,527 | 2/1972 | Brinkmann | 525/64 |
| 3,702,350 | 11/1972 | Kimura | 525/438 |
| 4,010,222 | 3/1977 | Shik | 525/176 |
| 4,219,628 | 8/1980 | Weemes | 525/176 |
| 4,294,938 | 10/1981 | Berr | 525/176 |
| 4,303,573 | 12/1981 | Ostapchenko | 524/449 |
| 4,322,335 | 3/1982 | Nield | 525/176 |
| 4,336,685 | 6/1982 | Eisenstein | 525/176 |
| 4,366,273 | 12/1982 | Aharoni | 525/176 |
| 4,412,040 | 10/1983 | Albee | 525/176 |

FOREIGN PATENT DOCUMENTS

| | | | |
|---|---|---|---|
| 49-034744 | 9/1974 | Japan | 525/177 |
| 1183086 | 3/1970 | United Kingdom | 525/408 |

Primary Examiner—Patricia A. Short
Attorney, Agent, or Firm—Jeffrey S. Boone

[57] ABSTRACT

The invention relates to a hydrophilic moulding compound of homopolyester and/or copolyester which contains 1 to 20 percent by weight of an alkaline and/or alkaline-earth salt of salt-forming polymer and/or copolymers from ethylenic unsaturated monomers as finely dispersed filling material, having in particualr a maximum particle size of 1 um, the salt-forming polymers being composed in particular of the following single monomers or mixtures thereof: vinyl-sulfonic acid, acrylamidoalkylene-sulfonic acid, sulfonated styrene, acrylic acid, methacrylic acid, maleic acid, fumaric acid, itaconic acid, crotonic acid, vinyl-phosphonic acid, monoalkyl ester of maleic acid, monoalkyl ester of fumaric acid.

The invention also relates to a process according to which the salts are preferably added to the polycondensation mixture of the polyester starting materials before and/or during poly-condensation as a suspension in polyhydric alcohol.

The moulding compound is preferably used for making filament yarns, or staple fibers.

6 Claims, No Drawings

HYDROPHILIC POLYESTER COMPOUNDS

BACKGROUND OF THE INVENTION

1. Field of the Invention

This invention relates to a hydrophilic molding compound of homopolyester or copolyester, a process for the preparation of the same and to the utilization of this molding compound as material for the formation of hydrophilic homopolyester or copolyester fibers.

2. Description of the Prior Art

It is known that the wearing hygiene and, consequently, also the wearing comfort, of a textile depends essentially upon its heat and moisture transport ability. Natural fibers are hydrophilic; i.e., they take up substantial moisture from the air and have a high absorbency and a large water retention capacity. However, when the body releases heat and starts to perspire, natural fibers have drawbacks as compared to polyester. For example, in swelling, the fiber cross section of wool increases some 25%, that of polyester only by 1% (Robinson, Textilpraxis International, 1976, p. 1180). As a result, and particularly with dense textiles, the permeability to air and, hence, the direct moisture transport through the textile, are inhibited. Moreover, during the absorption of water by wool, much more additional heat is generated, namely 113 J/g water (27 cal/g water), than during the absorption of water by polyester, namely 3.35 J/g water (0.8 cal/g water) (Robinson Textilveredlung, 1977, p. 264). Closely related to this thermal effect is that with increasing temperature, the absorbency of wool declines significantly. Finally, textiles of polyester dry much faster than those of wool. The advantages of polyester in this context are essentially based upon the fact that it takes up much less water. On the other hand, the low water uptake is a cause of the unsatisfactory wearing hygiene and of the low wearing comfort of polyester.

It has long been desired to eliminate this drawback of polyester; that is, to improve its moisture uptake and water retention while not compromising its other favorable characteristics.

Among other things, chemical modification of either the entire fiber or of merely the fiber surface has been carried out in an attempt to improve polyester's hydrophilic nature. This course has, however, not resulted in any convincing success.

Actually, it is considered to be more advantageous to physically change the fiber structure, e.g., by increasing the absorbent fiber surface. Melliand Textilberichte 1/1977, pp. 11-12, describes a proposed structure for such fiber, which, in the case of polyacrylonitrile fibers, has apparently already been realized. This polyacrylonitrile fiber consists of a core comprising a large number of capillary pores and a skin with a great many fine channels capable of conveying water from the outside into the porous inside of the fiber. The skin protects the internal pore system and ensures smooth processing.

According to a process described in German Patent Application OS No. 25 54 124, such hydrophilic polyacrylonitrile fibers are obtained by a dry-spinning process whereby one adds to the spinning solvent which is selected from the group comprising dimethyl acetamide, dimethyl sulfoxide, N-methyl pyrrolidone or dimethyl formamide, from 5 to 50 wt. %, based on solvent and solid, of a liquid having a higher boiling point than the spinning solvent used, which mixes well with the spinning solvent and with water and which is a non-solvent of the polymer to be spun. Examples of these liquids are: alkyl ethers and alkyl esters of multivalent alcohols, high boiling alcohols, esters and ketones. The use of glycerin is preferred. The filaments obtained in this manner have a skin/core structure, a porous core with pores of an average diameter of 0.5 to 1 microns (=5000 to 10000 Å), a moisture uptake of about 2 to 5% (at 65% relative humidity and 21° C.) and a water retention of 10 to 30%.

Dry-spun fibers of skin/core structure obtained by acrylonitrile polymerizates having a moisture uptake of at least 7% (at 65% RH and 21° C.) and a water retention of at least 25% are described in German Patent Application OS No. 26 07 071. These fibers are obtained by spinning a COOH group containing acrylonitrile polymer from a solvent to which is added from 5 to 50 wt. %, based on the total weight of the solution, of a compound having a boiling point higher than that of the spinning solvent, which is miscible with water and with the spinning solvent and does not dissolve the copolymer, followed by washing out the compound added to the solvent from the freshly spun thread and by converting all or part of the carboxyl groups into the salt.

While the above described process is applicable to polyacrylonitrile, it cannot be used on a production scale with most polyesters to improve their hydrophilic properties. Polyacrylonitrile is obtained by a dry-spinning process, that is, it is spun from an organic solvent at comparatively low temperatures. Conversely, polyesters are spun on a production scale at nearly 300° C. from a melt, i.e., under much more critical conditions. Moreover, nonmodified polyacrylonitrile has already a comparatively high moisture uptake of about 1.5%. Unmodified polyester has, by contrast, a much lower moisture uptake of merely 0.3 to 0.6%.

There are also a great many porous polyester fibers which may be obtained, as by special drawing methods or by blowing with inert gases. Like the above-described polyacrylonitrile fibers, they exhibit large pores visible under the light microscope, but which do not significantly increase the moisture uptake.

German Patent Application OS No. 27 55 341 describes hydrophilic polyester fibers characterized in that they possess a stable microporous system subject to capillary condensation at 20° C. and a relative humidity of less than 97%, and which have at least 40° C. and 92% relative humidity, a moisture uptake of more than 2 wt. %, whereby the moisture uptake attributable to capillary condensation represents at least 25%. Said fibers are obtained by spinning a polymer compound containing from 1 to 20 wt. % of one or more oxalato complexes of the general formula $Me_n[Z(C_2O_4)_m]$ (Me=alkali metal, Z=central atom such as e.g., Al, Fe, Zn, Zr, Cr, Mg, Cu, n=1, 2, 3 or 4, m=2, 3 or 4), by drawing the resulting thread and by hydrosetting at temperatures ranging from 90° to 170° C. in the presence of liquid water.

German Patent Application OS No. 23 64 628 describes hydrophilic structures of water-insoluble polymers. Mention is made of, among others, polyester and polyethylene terephthalate which contains particles of otherwise water-soluble cellulose ethers which, by cross linking or modification, have become almost completely or completely insoluble, but still able to take up water. These particles are either evenly distributed in the polymer compound or cover the surface thereof. The particle size of the particles in the polymer is 10 micron to 2 mm. It will be recognized, however, that particles of such large size exhibit serious drawbacks, especially in terms of the mechanical properties of the structures obtained from these mixtures.

A new route to obtain hydrophilic polyesters has been found. The subject matter of the invention is a hydrophilic molding compound of homopolyester and/or copolyester, characterized in that it contains 1 to 20 wt. % of an alkali and/or alkaline earth salt of salt-forming polymers and/or copolymers of ethylene-unsaturated monomers as filler in a finely dispersed distribution.

The term polyester refers to both homopolyester and copolyester of terephthalic and isophthalic acid with one or more of the following polyvalent alcohols: ethylene glycol; diethylene glycol; 1,2-propanediol; 1,3-propanediol and 1,4-butanediol. The polyester is preferably composed of at least 80 wt. %, based on the polyester component, of polyethylene terephthalate.

A finely dispersed distribution in the sense of the application refers to dispersions of the fillers in the polyester whose maximal particle size does not substantially exceed 2 microns. The maximum particle size is preferably 1 micron. Depending on end use, the filler component amounts to preferably 3 to 12 weight percent. When used as filament or fiber material, the filler constituent in the special development of the invention amounts to 5-8 weight percent.

The salt-forming polymers and/or copolymers are formed from one or more monomers selected from the group comprising vinyl sulfonic acid, acrylamidoalkylene sulfonic acid, sulfonated styrene, acrylic acid, methacrylic acid, maleic acid, fumaric acid, itaconic acid, crotonic acid, vinyl phosphonic acid, monoalkyl ester of maleic acid and monoalkylester of fumaric acid.

In many cases, it has been found advantageous for the salt-forming polymers to also include comonomers selected from the group comprising styrene, alpha-olefins, vinyl alkyl ethers and esters of the aforementioned monomers.

In the molding compounds of the invention, the additives rendering the polyester hydrophilic are present as calcium or magnesium salt or as calcium or magnesium double salt with lithium, potassium or sodium. Pure lithium, potassium or sodium salts of the salt-forming polymers, while imparting to the polyester compound a high moisture absorbency, often produce an undesirable increase in melt viscosity of the molding compound, thus complicating polycondensation and processing. Although the pure calcium and magnesium salts of the invention result in a lower moisture absorbency of the polyester compound than that obtained with pure alkali salts, they do not substantially raise the melt viscosity. The double salts of a calcium or a magnesium salt with a lithium, potassium or sodium salt display very good characteristics. These double salts of the invention combine the properties of both alkali salts and alkaline earth salts, i.e., they impart a high moisture absorbency without significant increase in the melt viscosity of the polyester. The alkali salt and/or alkaline earth salt of the salt-forming polymer is preferably a double salt of calcium or magnesium with 20 to 70 equivalent percent, especially 40 to 60 equivalent percent of lithium, potassium or sodium salt.

The alkali salt and/or alkaline earth salts of the salt-forming polymers can be used with and without cross linking. It is surprising to find that even after repeated washing, non-cross linked polymer salts are not or only slightly removed. Cross linking agents for this purpose are the conventional agents such as divinyl benzene or divinyl ethylene glycol with divinyl benzene being preferred. The degree of desirable cross linking is determined by the type of alkali salt or alkaline earth salt of the salt-forming polymers, whereby the cross linking agent component may amount up to 10 mole % based on the alkali salt or alkaline earth salt of the salt-forming polymer, preferably 2 to 5 mole percent.

The molding compounds of the invention of the invention may, of course, contain additions of conventional polyester stabilizers, pigments, nucleating agents, viscosity-controlling agents, etc. The molding compounds of the invention can be processed to shaped articles whose physical properties correspond to those of polyester materials with comparable quantities of additives. This applies specifically in cases where the molding compounds of the invention are used for the production of fibers. In the case of non-textile end uses, it is possible to increase the polymer salt content of the polyester to up to 20 wt. %. By doing so, the hydrophilic nature of the end product is considerably enhanced.

The alkali salts or alkaline earth salts of salt-forming polymers used within the scope of the invention may be obtained by any known polymerization process. However, use is preferably made of salts of polymers obtained from polymerizations wherein the monomers or, as the case may be, the comonomers of the polymer salts are polymerized or copolymerized in an inert solvent in the presence of a wetting agent and an initiator at temperatures between 80° and 100° C., followed by the conversion of the resulting homopolymer and copolymer to the salt(s) by the addition of alkali hydroxide and/or alkaline earth hydroxide with the application of heat for several hours, followed by separation, washing and drying of said salt(s).

In the preferred version of the process, inert solvents are expediently selected which do not cause swelling of the polymer salts and yield them in a form allowing favorable filtration. Examples of suitable solvents are: benzene, toluene, xylene, hydrocarbons (ligroin) and chlorinated aromatics such as chlorobenzene. Suitable wetting agents are: non-ionic surfactants such as, e.g., ethoxylated fatty alcohols or ethoxylated nonyl phenol.

As initiators, use is made of conventional compounds, e.g., peroxides like dibenzoylperoxide, tert.butylperoxy-2-ethyl-hexanoate, tert.butylperoxy-isopropyl carbonate, or azodiisobutyronitrile. Initiators are used in conventional quantities, e.g., in amounts of 0.2 to 0.4 wt. %, based on monomers. The monomer(s) is/are preferably added together with the cross linking agent portion by portion during the polymerization. This ensures uniform cross linking and a substantially uniform particle size.

Conversion of homopolymers or copolymers into the polymer salts can be accomplished without separation of the solid in the polymerization system by addition of the alkaline earth hydroxide or, as the case may be, the alkali hydroxide followed by heating for several hours. The heating temperature is preferably the boiling temperature of the solvent. As a rule, 24 to 48 hours are required for a practically quantitative salt formation. The salts are then separated and washed in a suitable liquid. Suitable washing liquids are methanol and ethanol.

The polymer salts can also be obtained by first heating the polymers in one of the above-cited solvents with solid calcium or magnesium hydroxide, followed by addition of solid lithium hydroxide, potassium hydroxide or sodium hydroxide, separation of the solids by suction, by take-up in alcohol and continued heating until total neutralization. This procedure has the advantage that neutralization, which proceeds slowly in the cited solvents, is much more rapid in the alcohol medium. It is also possible in the preparation of the polymer salts to start with the salt form of the monomers and to polymerize the salts. Polymerization can be carried out in an alcohol medium, e.g., in methanol with 10 to 15 wt. % water. With this method, the cross linking agent can also be added together with the monomer, portion by portion, to the polymerization system. Azoisobutyronitrile is a suitable initiator. The mole ratio of initiator to monomer can be 1:500, for which the polymerization time is about 24 hours. The advantage of this procedure is that salt formation with the monomer is substantially faster and more economical, and that, moreover, salt formation and polymerization are carried out in one reactor using only one solvent. The polymer salt is obtained in a finely dispersed form, is separated by suction and the monomer is washed out with, e.g., methanol.

Polymerization or copolymerization of vinylsulfonic acid and/or acrylamidoalkylene sulfonic acid is expediently carried out in water, preferably at 50° to 60° C., in the presence of a redox (oxidation-reduction) catalyst. After addition of alkali hydroxide or alkaline earth hydroxide, heating is continued for several hours, the alkali salt or alkaline earth salt is precipitated by addition of, e.g., alcohol, and then, after separation of the salt, the latter is dried.

The subject matter of the invention is also a process for the preparation of the molding compounds of the invention by incorporating into the polyester compound of from 1–20 wt. % of an alkali salt and/or alkaline earth salt of a salt-forming polymer and/or copolymer. Preferably, the proportion of alkali salt and/or alkaline earth salt of a salt-forming polymer and/or copolymer to be incorporated represents 3 to 12 wt. % and, in a particularly useful embodiment, from 5 to 8 wt. %.

The dried polymer salts are suspended, preferably in the polyvalent alcohols participating in the polyester synthesis. The solid content of the suspension is preferably 20 to 25 wt. %. To increase the dispersion of the polymer salts, the suspension of the salt(s) is preferably homogenized in polyvalent alcohol before addition to the polyester starting materials. This can be accomplished, for example, in a Pearl mill. The salt is ground so that the maximum particle size is preferably less than 1 micron. Polycondensation is then carried out in the conventional manner in conjunction with standard transesterification and polycondensation catalysts. The hydrophilic molding compounds of the invention are distinguished by a high moisture absorbency. Water is reversibly bonded by absorption from both the liquid and the vapor phases. The moisture absorbency of the molding compounds ranges between 3 and 10 wt. %, and for the preferred molding compounds between 4 and 8 wt. %. Consequently, the hydrophilic molding compounds of the invention possess, compared with conventional polyesters, a surprisingly high moisture absorbency. The following table lists some figures for a conventional polyethylene terephthalate fiber and for a polyethylene terephthalate fiber, obtained according to the invention, which contains 7.5 wt. % of a lithium/-calcium polyacrylate (mole ratio Li:Ca=60:40) cross linked by means of 2 mole % divinyl benzene. Determinations were performed in accordance with DIN 54 201 at a constant atmosphere of 20° C./65% RH (standard climate according to DIN 50 014), 34° C./92% RH and 40° C./92% RH (warm-humid constant climate as per DIN 50 015):

| Moisture Uptake (in wt. %) For Polyethylene Terephthalate Fiber | | |
|---|---|---|
| Fiber Climate | Conventional | According To The Invention |
| 20° C./65% RH | 0.3 | 1.8 |
| 34° C./92% RH | 0.5 | 5.6 |
| 40° C./92% RH | 0.6 | 6.3 |

It is clear from the table that the polyester fibers of the invention exhibit in a standard atmosphere of 20° C./65% RH, as well as at higher temperatures and higher moisture levels, a substantially higher moisture absorbency than conventional polyesters. In this context, and in terms of wearing comfort, the absolute moisture absorbency is of less importance than the difference in moisture uptake between that observed at 20° C./65% RH and that observed during the actual wearing of a garment.

The constant condition of 34° C./92% RH is known to correspond to body conditions at the skin at the upper limit of the comfort range, and the difference in moisture uptake, as a result, corresponds to the moisture uptake capability of the textile material when worn to the limit of the comfort range. For standard polyethylene terephthalate, the difference by weight is only 0.2%, whereas for the hydrophilic polyester fiber of the invention it is about 4.0%.

Another important property of the fiber of the invention is the high water retention. Water retention is usually determined according to DIN 53 814 wherein a specific quantity of the material to be investigated is completely soaked with water in combination with a wetting agent and then centrifuged under precisely defined conditions. The centrifuged specimen is weighed, dried and weighed once again. The difference between the two weighings represents the water retained after centrifuging of the specimen. Standard polyester has, as a rule, a water retention of about 2 to 5% by weight, whereas the fiber of the invention has a water retention of 8 to 20%, and preferably 10 to 15%. The water retention of a textile material is of decisive importance, in terms of the use characteristics of the material.

Another important characteristic of textiles, in terms of wearing comfort, is the moisture perception limit. It indicates at what moisture content (in % by weight) a textile specimen feels moist.

Two methods were employed to determine the moisture perception limit. In one method, use was made of dried textile specimens, e.g., flat knit samples, which were exposed to an increasingly more humid atmosphere. In the other method, use was made of textile specimens which were wetted, in keeping with the process for the determination of the water retention (DIN 53 814), and then dried in a standard atmosphere (20° C. and 65% RH). In both cases, a panel of at least 4 persons was used to judge whether T-shirts constructed of the textile specimens feel dry enough to be comfortably worn under the test conditions. Using these methods, the moisture perception limit of standard polyester was found to be about 0.4% by weight and of cotton about 8% by weight. The moisture perception limit of the fibers of the invention was found to be about 5 to 6% by weight.

Also, in terms of moisture release, the fibers of the invention display excellent properties. The parameter of "moisture release" characterizes, in a relative way, the time required for a specimen which has been pre-moistened according to DIN 53 184 in a standard atmosphere of 20° C. and 65% RH, to release a specified amount of moisture. Of particular significance in moisture release determinations is the time which must elapse before moisture perception limit is reached. If the relative time for this to occur for conventional polyethylene terephthalate is taken to be 1, then the relative times for the hydrophilic polyester of the invention, wool and cotton have been found to be 1.3, 2.5 and 3, respectively. In other words, it has been found that, with the hydrophilic polyesters of the invention, the point during drying at which the textile material feels dry is reached much faster than with wool or cotton.

In addition to the above-described properties relating to hydrophilic nature, fibers produced from the molding compounds of the invention also exhibit excellent textile properties comparable to those of conventional polyester fibers. The fibers of the invention can be spun in the conventional deniers and possess good textile properties.

The dye affinity of the fibers of the invention is very good, as well. In fact, the dye uptake of the polyester fibers of the invention is greater than that of conventional polyester fiber.

Optical properties of the fibers produced from the hydrophilic molding compound of the invention correspond essentially to those of $TiO_2$-pigmented polyester fibers, i.e., they are deep/dull. Therefore, the addition of $TiO_2$ is not absolutely necessary for delustering.

The hydrophilic properties of the molding compounds of the invention are permanent. They are preserved during conventional further processing and during wear. Indeed, a significant increase in hydrophily is observed under the influence of home laundering. The invention is explained in further detail by way of the following examples:

EXAMPLE 1

Preparation of non-cross linked poly-Ca-methacrylate: 172.18 g (=2 moles) freshly distilled methacrylic acid were dissolved in 750 ml distilled water and 95% neutralized by the addition, portion by portion, under stirring, of 71 g of calcium hydroxide powder, the temperature of the mix being held below 30° C.

Subsequently, for complete neutralization, the mix was reacted with 10 g (excess) of calcium carbonate powder and stirred for one hour.

The mixture was then filtered until clear, the solution condensed under gentle conditions at no more than 40° C. bath temperature under vacuum and the dissolved substance was precipitated with 750 ml methanol. The finely crystalline monomer salt was dried under vacuum at 40° C. Yield=205 g.

The polymerization reaction was carried out in a 6-l 3 necked flask flushed with nitrogen, equipped with stirrer, a thermometer, a separating funnel for the activator solution and a cooler with liquid seal. 4.0 liters of methanol, 500 ml of dist. water and 7.5 g ennea-ethoxylated p-nonyl phenol (commercial product MARLO-PHEN-89, Chem. Werke Huels) as emulsifier were introduced into the apparatus. 157.68 g (0.75 mole=1.5 val) calcium methacrylate powder were stirred into the solution. After thorough nitrogen flushing, the suspension was heated to 60°-64° C. and activated with 0.29 g (0.0015 mole) of 85% azo-di-isobutyronitrile dissolved in 40 ml acetone.

Polymerization was carried out for 24 hours at 60° to 64° C. during which the crystalline suspension turned into a milky dispersion.

The finely dispersed product was isolated by suction from the still warm mixture and purified by boiling out, using 3 liters of methanol with a 10% water content in each of three successive washings.

The suctioned off semi-dry product was then fully dried under vacuum first for 12 hours at max. 40° C. and subsequently for 24 hours at 180° C. Yield=133 g.

According to analysis, the substance contained 18.1% Ca.

As indicated by microscopic evaluation of a smear of a 20% glycol dispersion, after mechanical distribution, the secondary agglomerate consisted mainly of particles of from 2 to 4 microns, and a small amount of particles of from 6 to 8 microns. After further grinding in a Pearl mill, the maximum particle size was less than 1 micron. The substance, in the form of a thin layer, absorbed 29.9% moisture by weight in a standard atmosphere (20° C./65% RH) and absorbed 61.0% moisture by weight in an extremely moist atmosphere (40° C./92% RH).

EXAMPLE 2

Preparation of non-cross linked poly-Na-/Ca methacrylate with an ion ratio Na/Ca=approx. 30:70 equivalent %.

Into a stirring apparatus with external cooling—and nitrogen blanket—was placed 58.7 g (0.682 mole) of freshly distilled methacrylic acid, dissolved in 800 ml methanol, and neutralized to approx. 95% by the addition, drop by drop, of a solution of 26.44 g 98% sodium hydroxide in 200 ml dist. water at a temperature below 30° C. The reaction was completed within one hour with 10 g (excess) fine sodium bicarbonate powder. By means of this procedure, undesirable discolorations of the monomer salt solution were avoided.

Subsequently, the monomer salt solution was filtered till clear and transferred to a 6-l stirring apparatus with nitrogen blanket, thermometer, dripping funnel for the activator solution and a cooler with liquid seal. The solution was diluted with 1000 ml methanol and then reacted with 10 g emulsifier (ennea-ethoxylated p-nonyl-phenol as the commercial product Marlophen-89) and 147.17 g (1.4 val) fine calcium methacrylate powder (prepared as in Ex. 1).

After careful nitrogen flushing, the mixture was heated to 60°-64° C. and after addition of the initiator solution—0.40 g (0.002 mole) 85% azo-di-isobutyronitrile in 40 ml acetone—polymerized for 24 hours.

The finely dispersed precipitated reaction product was separated from the still warm reaction mix by suction and purified by boiling using 3 liters of methanol containing 10% water in each of three washing cycles.

The suctioned off poly salt was dried under vacuum in two stages (12 hours at 40° C., then 24 hours at 180° C.). Yield=190 g.

The product contained 6.02% Na and 12.9% Ca corresponding to an ion ratio of 29.0:71.0 equivalent %.

After exposure, in the form of a thin layer, for 24 hours in a standard atmosphere (20° C./65% RH) and in extremely humid atmosphere (40° C./92% RH), the substance absorbed 38.5% and 91.3% moisture by weight, respectively.

EXAMPLE 3

Preparation of non-cross linked poly-Li/Ca-methacrylate having an ion ratio of Li:Ca of 30:70 equivalent %.

In a 2-l stirring apparatus, equipped with a nitrogen blanket, a solution consisting of 58.7 g (0.682 mole) freshly distilled methacrylic acid, 800 ml methanol and 200 ml distilled water was reacted, portion by portion, with 15.46 g 98% lithium hydroxide powder, with cooling to between 20° and 30° C. The neutralization, which at first reached 95% completion, was subsequently completed with the addition of 10 g (excess) lithium carbonate powder over a period of 1 hour.

The monomer salt solution was filtered till clear and introduced into a 4-l stirring apparatus equipped with nitrogen blanket, thermometer, dripping funnel for the activator solution as well as with a cooler with liquid seal. The solution was diluted with 1000 ml methanol and reacted with 10 g non-ionic emulsifier (ennea-ethoxylated p-nonyl-phenol as commercial product "Marlophen 89") as well as with 147.17 g (1.4 val) fine calcium methacrylate powder as described in Example 1. After thorough flushing of the apparatus with nitrogen, the mixture was heated to 60°-64° C., then treated with the initiator, 0.40 g (0.002 mole) 85% azo-diisobutyronitrile dissolved in approxmately 40 ml acetone, and polymerized for 24 hours. The finely dispersed precipitated poly salt was separated by suctioning off from the still warm reaction mixture and purified by boiling, using 3 liters of methanol containing 10% water in each of three washing cycles.

The suctioned off poly salt was dried in two stages: 12 hours at max. 40° C. and 24 hours at 180° C. Yield: 190 g.

Metal contents were 1.88% Li and 12.15% Ca, corresponding to an ion ratio Li:Ca=30.9:69.1 equivalent %.

Moisture absorbency after 24 hours conditioning at 20° C./65% RH and 40° C./92% RH was 36.0% and 91.4% by weight, respectively.

EXAMPLE 4

Preparation of non-cross linked Na/Ca polyacrylate having an ion ratio Na:Ca=40:60 equivalent %.

Into a 6-l stirring apparatus under nitrogen blanket equipped with thermometer, a dripping funnel for initiator solution and monomeric acid solution and a cooler with liquid seal were introduced 2.5 liters of toluene and 20 g of emulsifier (ennea-ethoxylated p-nonyl-phenol as commercial product "Marlophen-89"). After thorough nitrogen flushing and bringing the temperature to 95°-97° C., addition was made of the activator solution, 0.71 g (0.004 mole) tert.butyl-peroxy-isopropyl-carbonate in 40 ml acetone, and subsequently, the monomer solution consisting of 288.24 g (4 moles) of freshly distilled acrylic acid, dissolved in enough toluene to make 500 ml, was added, drop by drop, during a period of 5 hours in the presence of vigorous agitation. Polymerization was carried out for a total of 24 hours at 95°-97° C. The polyacrylic acid precipitated as a finely dispersed material.

After completion of the polymerization, and without changing the temperature, 90.15 g of 98.6% calcium hydroxide powder was rapidly added, portion by portion, to the system which was then allowed to react for 3 hours. Subsequently, the temperature was reduced to approx. 75° C. and a solution of 65.31 g of 98% sodium hydroxide in 250 ml methanol was added through the dripping funnel within one half hour. The reaction proceeded for 3 hours and the methanol was continuously eliminated via a separator.

The reaction mixture was then cooled and the finely dispersed solid separated by suctioning from the solvent.

The partly neutralized material still containing substantial amounts of toluene was subsequently introduced into 3 liters of methanol. The system was heated for 3 to 4 hours to near the boiling point under vigorous stirring.

After cooling, the finely dispersed poly salt was separated by suction from the reaction mixture and purified by repeated rinsing with methanol, followed by suction, until the salt was neutral and free of monomer. Generally, three washing cycles, each using 3 liters of methanol, were sufficient.

Finally, the purified product was dried under vacuum in two stages—12 hours at max. 40° C., then 24 hours at 180° C. Yield: 398 g.

Analysis: 9.07% Na and 11.2% Ca, corresponding to an ion ratio of Na:Ca=41.4:58.6 equivalent %.

After exposure for 24 hours to a standard atmosphere (20° C./65% RH) and to an extremely humid atmosphere (40° C./92% RH), the product absorbed 20.9% and 101.9% moisture, by weight, respectively.

EXAMPLE 5

Preparation of non-cross linked Li-/Ca polyacrylate having an ion ratio Li:Ca=40:60 equivalent %.

To a 6-l stirring apparatus, under a nitrogen blanket, equipped with a thermometer, a dripping funnel for the initiator solution and the monomeric acid solution, and a cooler with liquid seal, were added 2.5 liters of toluene and 20 g emulsifier (ennea-ethoxylated p-nonyl-phenol). After thorough nitrogen flushing and simultaneous heating to 95°-97° C., this was followed by the addition of the activator solution comprising 0.71 g (0.004 mole) tert.butyl-peroxy-isopropyl carbonate in 40 ml acetone. Subsequently, under vigorous stirring, a solution of 288.24 g (4 moles) of freshly distilled acrylic acid in toluene—adjusted to 500 ml—was added, drop by drop, over a period of 5 hours. The reaction during which finely dispersed polyacrylic acid precipitated continued for 24 hours.

During the first neutralization stage, 90.15 g of 98.6% calcium hydroxide powder was added rapidly, portion by portion, and the system was allowed to react for 3 hours under vigorous stirring. Subsequently 38.29 g of 98% Lithiumhydroxide powder was added, portion by portion and the reaction mixture was allowed to react for an additional 3 hours. The reaction mixture was subsequently cooled, the finely dispersed solid separated by suction and added to 3 liters of methanol. To complete neutralization, the system was vigorously stirred from 3 to 4 hours to near the boiling point.

After cooling, the finely dispersed poly salt was suctioned off and purified by repeated rinsing with 3 liter portions of methanol for 2 to 4 hours and subsequent separations until the polymer was neutral and free of monomer.

Subsequently, the purified product was dried in two stages under vacuum for 12 hours at max. 40° C., then for 24 hours at 180° C. Yield: 335 g.

Analysis produced 3.08% Li and 14.1% Ca corresponding to an ion ratio of Li:Ca=38.7:61.3 equivalent %.

After being exposed for 24 hours to a standard atmosphere (20° C./65% RH) and to an extremely humid atmosphere (40° C./92% RH), the product regained 32.2% and 103.5% moisture, by weight, respectively.

EXAMPLE 6A

Preparation of non-cross linked Li/Ca polyacrylate having an ion ratio Li:Ca=50:50 equivalent %.

To a 6-1 stirring apparatus, under a nitrogen atmosphere, equipped with a thermometer, a dripping funnel each for the initiator and the monomeric acid solution, and a cooler with liquid seal, were added 2.5 liters of toluene and 20 g. emulsifier (ennea-ethoxylated p-nonyl-phenol). After thorough nitrogen flushing and simultaneous heating to 95°-97° C., the above was activated with a solution of 0.71 g (0.004 mole) tert.butyl-peroxy-isoproprylcarbonate in 40 ml acetone. Subsequently, under vigorous stirring, a solution of 288.24 g (4 moles) freshly distilled acrylic acid in toluene, adjusted to 500 ml, was added, drop by drop, over a period of 5 hours. The polymerization was carried out at 95°-97° C. for a total reaction time of 24 hours.

Subsequently, neutralization was initiated by the rapid addition of 75.13 g of 98.6% calcium hydroxide powder, portion by portion, supplemented after 3 hours by the addition, portion by portion, of 47.86 g of 98% lithium hydroxide powder. After reacting another 3 hours, the mixture was cooled.

After cooling, the finely dispersed poly salt was suctioned off and the neutralization was completed by vigorous stirring in 3 liters of methanol, near the boiling point, for 4 hours. After cooling, the polymer salt was suctioned off and purified by repeated rinsing with three liter portions of methanol, at room temperature, so that a neutral, monomer-free polymer was obtained.

The purified product was subsequently dried under vacuun in two stages, 12 hours at max. 40° C., then 24 hours at 180° C. Yield: 330 g.

Analysis indicated 3.79% Li and 10.6% Ca corresponding to an ion ratio of Li:Ca=50.8:49.2 equivalent %.

After exposure for 24 hours to a standard atmosphere (20° C./65% RH) and to an extremely humid atmosphere (40° C./92% RH), the product absorbed 49.6% and 125.1% moisture, by weight respectively.

EXAMPLE 6B

Another sample was prepared, substantially as in Example 6A, above. Neutralisation was carried out by addition of 60.5 g of 98.6% Ca(OH)$_2$ and 58.65 g of 98% LiOH. Analysis indicated a Li:Ca cation ratio=59:41 equivalent %.

After exposure for 24 hours to a standard atmosphere (20° C./65% RH), and to an extremely humid atmosphere (40° C./92% RH), the product absorbed 41.6% and 140.2% moisture, by weight, respectively.

EXAMPLE 7A

Preparation of partly cross linked Li/Ca polyacrylate having an approximate ion ratio Li:Ca=50:50 equivalent %, cross linked with 1 mole % divinyl benzene.

To a 6-1 stirring apparatus, under nitrogen atmosphere, equipped with a thermometer, a dripping funnel each for the initiator and the monomer solution, as well as a cooler with liquid seal, were added 2.5 liters of toluene and 20 g emulsifier (ennea ethoxylated p-nonyl-phenol), followed by heating to 95°-97° C. under thorough nitrogen flushing. After adding the initiator solution, 0.72 g (0.00404 mole) tert.butyl-peroxy-isopropyl carbonate in 40 ml acetone, a monomer solution comprising 288.24 g (4 moles) of freshly distilled acrylic acid, and 10.52 g (0.04 mole) of freshly distilled divinyl benzene (in the commercial form with 50% active substance) in toluene, adjusted to 500 ml., was added, drop by drop, over a period of 5 hours. Polymerization was carried out at 95°-97° C. for a total reaction time of 24 hours.

Subsequently, neutralization was initiated by the rapid addition of 75.13 g of 98.6% calcium hydroxide powder, supplemented after 3 hours by the addition of 47.86 g 98% lithium hydroxide powder. After an additional 3 hours of reaction, the mixture was cooled.

The finely dispersed solid was suctioned off, added to 3 liters of methanol and reacted for 4 hours under vigorous stirring near the boiling point to complete neutralization. After cooling, the polymer salt was suctioned off and washed repeatedly in three liter portions of methanol, at room temperature, so that it was neutral and free of monomers.

The purified product was subsequently dried under vacuum in two stages: 12 hours at max. 40° C., 24 hours at 180° C. Yield: 328 g.

The product contained 3.52% Li and 10.9% Ca, corresponding to an ion ratio of Li:Ca=48.3:51.7 equivalent %.

After exposure for 24 hours to a standard atmosphere (20° C./65% RH) and to an extremely humid atmosphere (40° C./92% RH), the product absorbed 47.4% and 119.7% moisture, by weight, respectively.

EXAMPLES 7B-7D

Three more samples with different amounts of cross-linking equal were prepared, under the conditions as described in Example 7A, above. The amounts of divinyl benzene (in the commercial form with 50% active substance), 98.6% calcium hydroxide powder and 98% Lithium hydroxide powder were as follows

| example | 50% divinyl benzene | | | 98.6% Ca(OH)$_2$ | 98% LiOH |
|---|---|---|---|---|---|
| 7B | 32.21 g | 0.42 moles | 3 molar-% | 75.13 g | 47.86 g |
| 7C | 54.81 g | 0.24 moles | 5 molar-% | 75.43 g | 47.86 g |
| 7D | 21.25 g | 0.08 moles | 2 molar-% | 60.40 g | 58.65 g |

The respective cation ratios for each of these three samples are given in Table 1.

EXAMPLE 8

Samples of eleven different molding compounds were prepared in accordance with the invention, utilizing the various polymeric salts (fillers) prepared in Examples 1 through 7.

In the preparation of each of the seven molding compounds, 240 grams of each of the respective filler polymers were added to 960 grams of ethylene glycol and incorporated into a slurry or dispersion by vigorous stirring. The slurry was then ground for about 3 hours in a Pearl mill (PML, Draiswerke Co., Mannheim) with an equal mass of quartz beads having a diameter of from 0.75 to 1.0 mm. After grinding, the diameter of the largest filler particle in the dispersion was about 2 microns, while most of the particles measured less than 1 micron. Subsequently, the quartz beads were removed by filtration through a screen.

Next, 750 grams of the dispersion thus prepared (which, by implication, contained 150 grams of filler polymer) were introduced into a polycondensation vessel, together with 1850 grams of dimethyl terephthalate and 1600 grams of ethylene glycol, at a mixing speed of 30 rpm and at a temperature of 245° C. Polycondensation was then carried out with conventional catalysts to a relative viscosity of 1.63 (1% in cresol).

The resulting polycondensate was processed into chips, in the conventional manner, and dried for 24 hours at 125° C. and 60 Torr. The chips were then spun at 296° C. (spinning head temperature) into filament yarn with a denier per filament of 3.3 dtex and a total denier, for 48 filament yarn, of approximately 150 dtex. The yarn was drawn to a ratio of 1:4.2 and subsequently twisted.

The yarns produced in the above manner were each found to possess light stability, light fastness and a solution viscosity quite similar to that exhibited by conventional polyethylene terephthalate produced in the above manner, but not comprising any filler.

Table 1 provides a compilation of test data yielded by the evaluation of the yarns produced as described above. It will be noted from the data provided that yarns obtained from molding compounds prepared in accordance with the invention exhibit unexpectedly good moisture absorbency.

EXAMPLE 9A

Starting materials:
700.00 g. (1.62 moles) 30% sodium vinyl sulfonate in $H_2O$
210.00 g. (2.96 moles) acrylic acid
92.60 g. (1.25 moles) $Ca(OH)_2$
18.40 g (0.46 moles) NaOH
0.61 g. $K_2S_2O_8$
0.25 g. Na $HSO_3$ The solution of sodium vinyl sulfate and acrylic acid was introduced into a three neck flask and flushed for 30 minutes with nitrogen. Then, the two initiators were added and the system was heated to 55°–60° C. in order to begin the reaction. Since the reaction is exothermic, the reaction system was cooled after the onset of the reaction in order to maintain the specified temperature. When the temperature finally started to drop, the system was heated again for 3 hours at 60° C. A high viscosity solution resulted. 500 ml. of water and the calcium hydroxide were added. The solution became thin once again. Two hours later, the sodium hydroxide was added and, after another 2 hours, the polymer was precipitated with 10 liters of ethanol, then suctioned off and dried at 100° C.

Utilizing the filler polymer thus synthesized, yarn was produced from molding compound prepared by the method given in Example 8. Test data for this yarn is given in Table 2.

EXAMPLE 9B

Starting materials:
980.00 g. (2.26 mole) 30% Na vinyl sulfonate in $H_2O$
126.00 g. (1.77 mole) acrylic acid
55.50 g (0.75 mole) $Ca(OH)_2$
10.80 g (0.27 mole) NaOH
1.2 g $K_2S_2O_8$
0.5 g $NaHSO_3$ Using the above starting materials, yarn was produced as in Example 9A. Test data for this yarn is given in Table 2.

EXAMPLE 10

Using a molding compound obtained as per Example 8 with a filler according to Example 6, a double screw extruder, a spinning pump, a slotted die 180 mm wide with a slot width of 500 microns, a film was obtained which, after cooling to 130° C., was stretched biaxially. The resulting film had a thickness of 100 microns and exhibited good hydrophilic characteristics. It was suitable, for example, as packing material which allows moisture equalization.

EXAMPLE 11

A filler obtained according to Example 9 was incorporated into polyethylene terephthalate, as outlined in Example 8, so that the filler comprised 18 wt. % of the mixture. The molding compound thus prepared was conventionally shaped in a die casting machine in the form of a plant container (flower pot). The container had a deep/dull appearance and was well suited for hydroculture. Similar moldings can be used as evaporative coolers, as for beverages and the like, when wet with water.

While the invention has been described with reference to certain specific examples and illustrative embodiments, it is, of course, not intended to be so limited except insofar as appears in the accompanying claims.

TABLE 1

| Molding Compound of Example | Filler Polymer | Cation Ratio (equivalent mole %) | Cross Linking Agent | Filler Polymer as per Example | Content of Filler In Molding Compound (wt. %) | Results Moisture Absorbency (wt. %) 20° C. 65% RH | 40° C. 92% RH | Water Retention (wt. %) |
|---|---|---|---|---|---|---|---|---|
| Control | None | — | — | — | — | 0.3% | 0.6% | 3.44% |
| 8/1 | Poly-Ca—Methacrylate | Ca = 100 | None | 1 | 7.1% | 1.6% | 3.3% | |
| 8/2 | Poly- Na—/Ca—methacrylate | Na:Ca = 29:71 | None | 2 | 5.9% | 1.8% | 3.6% | |
| 8/3 | Poly- Li-/Ca—methacrylate | Li:Ca = 31:69 | None | 3 | 6.6% | 1.3% | 4.1% | |
| 8/4 | Na—/Ca—Polyacrylate | Na:Ca = 41:59 | None | 4 | 7.7% | 1.8% | 4.8% | |
| 8/5 | Li-/Ca—Polyacrylate | Li:Ca = 39:61 | None | 5 | 7.2% | 1.8% | 5.0% | 12.13% |
| 8/6A | Li-/Ca—Polyacrylate | Li:Ca = 51:49 | None | 6A | 6.9% | 1.3% | 5.6% | |

TABLE 1-continued

| Molding Compound of Example | Filler Polymer | Cation Ratio (equivalent mole %) | Cross Linking Agent | Filler Polymer as per Example | Content of Filler In Molding Compound (wt. %) | Results Moisture Absorbency (wt. %) 20° C. 65% RH | 40° C. 92% RH | Water Retention (wt. %) |
|---|---|---|---|---|---|---|---|---|
| 8/7A | Li-/Ca—Polyacrylate | Li:Ca = 48:52 | 1 Mol-% Divinylbenzene | 7A | 7.3% | 1.7% | 6.1% | |
| 8/7B | Li-/Ca—Polyacrylate | Li:Ca = 52:48 | 3 Mol-% Divinylbenzene | 7B | 7.5% | 1.4% | 6.0% | |
| 8/7C | Li-Ca—Polyacrylate | Li:Ca = 46:54 | 5 Mol-% Divinylbenzene | 7C | 7.0% | 1.8% | 5.8% | |
| 8/6B | Li-/Ca—Polyacrylate | Li:Ca = 59:41 | None | 6B | 7.0% | 1.7% | 6.9% | |
| 8/7D | Li-/Ca—Polyacrylate | Li:Ca = 62:38 | 2 Mol-% Divinylbenzene | 7D | 7.6% | 2.3% | 6.4% | |

TABLE 2

| Molding Compound of Example | Filler Polymer | Cation Ratio (equivalent mole %) | Cross Linking Agent | Filler Polymer as per Example | Content of Filler In Molding Compound (wt. %) | Results Moisture Absorbency (wt. %) 20° C. 65% RH | 40° C. 92% RH | Water Retention (wt. %) |
|---|---|---|---|---|---|---|---|---|
| Control | None | — | — | — | — | 0.3% | 0.6% | 3.44% |
| 8/9A | Na—/Ca—Poly(vinylsulfonate/acrylate) 23.4:76.6 Mol-% | Na:Ca = 28:72 | None | 9A | 7.5% | 1.8% | 5.9% | |
| 8/9B | Na—/Ca—Poly(vinylsulfonate/acrylate) 43.2:56.8 Mol-% | Na:Ca = 61:39 | None | 9B | 7.7% | 2.4% | 5.9% | |

We claim:

1. A process for the production of a molding compound selected from the group consisting of a homopolyester and copolyester of terephthalic and isophthalic acid with one or more polyvalent alcohols selected from the group consisting of ethylene glycol, diethylene glycol, 1,2-propanediol, 1,3-propanediol and 1,4-butanediol, said molding compound comprising a mixed alkali-alkaline earth salt of calcium or magnesium, and 20 to 70 equivalent % lithium, potassium, or sodium, of salt-forming polymers selected from the group consisting of polymers formed from one or more monomers selected from the group consisting of vinyl sulfonic acid, acrylamidoalkylene sulfonic acid, sulfonated styrene, acrylic acid, methacrylic acid, maleic acid, fumaric acid, itaconic acid, crotonic acid, vinyl phosphonic acid, monoalkylester of maleic acid, and monoalkylester of fumaric acid, copolymers thereof with comonomers selected from the group comprising esters of said monomers, styrene, alpha-olefins and vinyl alkyl ethers, and mixture of said polymers and copolymers as filler, in a finely dispersed distribution, said process comprising the step of adding said filler polymer, as a suspension in a polyvalent alcohol, to the polycondensation system for said polyester before or during polycondensation.

2. The process of claim 1 wherein said alkali-alkaline earth salt of said salt forming polymer is obtained by the polymerization of said monomers in an inert solvent in the presence of a wetting agent and an initiator at a temperature of from 80° to 100° C., followed by the addition of alkali hydroxide and alkaline earth hydroxide and heating for several hours.

3. The process according to claim 1, characterized in that the alkali-alkaline earth salt of the salt-forming polymers is obtained by polymerization of vinyl sulfonic acid and/or acrylamidoalkylene sulfonic acid in water at 50° C. to 60° C., in the presence of a redox catalyst, followed by the addition of alkali hydroxide and alkaline earth hydroxide and heating for several hours, precipitation of the alkali-alkaline earth salt and separation.

4. A process for producing a molding compound, according to claim 2, further characterized in that said salt-forming polymer is obtained from the polymerization of said monomers and a cross-linking agent.

5. A process for producing a molding compound, according to claim 3, further characterized in that said salt-forming polymer is obtained from the polymerization of said monomers and a cross-linking agent.

6. The process, according to claim 1, further characterized in that the maximum particle of said filler polymer in said suspension is 1 micron.

* * * * *